US011425102B2

(12) United States Patent
Voss (10) Patent No.: US 11,425,102 B2
(45) Date of Patent: Aug. 23, 2022

(54) AIR GAP SYSTEM AND METHOD USING OUT OF BAND SIGNALING

(71) Applicant: Michael Steven Voss, Santa Monica, CA (US)

(72) Inventor: Michael Steven Voss, Santa Monica, CA (US)

(*) Notice: Subject to any disclaimer, the term of this patent is extended or adjusted under 35 U.S.C. 154(b) by 153 days.

(21) Appl. No.: 17/064,996

(22) Filed: Oct. 7, 2020

(65) Prior Publication Data

US 2021/0110068 A1 Apr. 15, 2021

Related U.S. Application Data

(60) Provisional application No. 62/914,830, filed on Oct. 14, 2019.

(51) Int. Cl.
| | |
|---|---|
| *H04L 29/06* | (2006.01) |
| *H04L 9/40* | (2022.01) |
| *G06F 13/40* | (2006.01) |
| *H04L 12/50* | (2006.01) |

(52) U.S. Cl.
CPC .......... *H04L 63/04* (2013.01); *G06F 13/4022* (2013.01); *H04L 12/50* (2013.01); *H04Q 2213/13003* (2013.01)

(58) Field of Classification Search
CPC . H04L 63/0209; H04L 63/1425; H04L 63/04; H04L 63/0227; H04L 63/1441; H04L 12/50; H04L 67/12; G06F 13/4022; G06F 21/75; G06F 16/21; H04Q 2213/13003; G06Q 10/06; G06Q 10/10; G06Q 10/107; G06Q 50/18; B60Y 2200/90; B60Y 2200/11; B60Y 2200/12; B60Y 2200/50; B60Y 2200/13; B60K 31/00; B60K 31/18; Y04S 40/18; G01C 21/00
See application file for complete search history.

(56) References Cited

U.S. PATENT DOCUMENTS

| | | |
|---|---|---|
| 5,041,009 A | 8/1991 | McCleerey |
| 5,123,015 A | 6/1992 | Brady, Jr. et al. |
| 5,210,740 A | 5/1993 | Anzai et al. |
| 6,317,352 B1 | 11/2001 | Halbert et al. |

(Continued)

FOREIGN PATENT DOCUMENTS

CN 2609062 Y 3/2004

OTHER PUBLICATIONS

International Search Report and Written Opinion dated Dec. 18, 2020, Patent Application No. PCT/US2020/054553, 10 pages.

*Primary Examiner* — Jung Liu (57) ABSTRACT

A method of communicating and securing data on a network with an air-gap device that includes switching of a first air-gap such that a second air-gap is generated between a second port and a first communication circuit to one or more devices, and such that a second operable connection is generated between a first communication circuit to the one or more devices and a third port. The air gap-device includes a first interface comprising a first port, the first interface being part of the first communication circuit to the one or more devices a second interface comprising the second port; a third interface comprising the third port; and a physical relay array block operably coupled to and corresponding to the first, second and third interfaces, with the physical relay array block configured for physical switching between a first and second configuration that generates the first and second switching.

20 Claims, 9 Drawing Sheets (56) References Cited

U.S. PATENT DOCUMENTS

| | | |
|---|---|---|
| 6,484,173 B1 | 11/2002 | O'Hare et al. |
| 6,799,235 B2 | 9/2004 | Bormann et al. |
| 8,468,244 B2 | 6/2013 | Redlich et al. |
| 2005/0184677 A1 | 8/2005 | Johnsen et al. |
| 2009/0063786 A1 | 3/2009 | Oh |
| 2010/0318785 A1 | 12/2010 | Ozgit |
| 2013/0201316 A1 | 8/2013 | Binder et al. |
| 2016/0126031 A1 | 5/2016 | Wootton et al. |
| 2016/0241583 A1 | 8/2016 | Kowalczyk et al. |
| 2016/0371097 A1 | 12/2016 | Magee |

AIR GAP SYSTEM AND METHOD USING OUT OF BAND SIGNALING

CROSS-REFERENCE TO RELATED APPLICATIONS

This application is a non-provisional of and claims the benefit of U.S. Provisional Application No. 62/914,830, filed Oct. 14, 2019, entitled "AIR GAP SYSTEM AND METHOD USING OUT OF BAND SIGNALING". This application is hereby incorporated herein by reference in its entirety and for all purposes.

BACKGROUND

A methodology in IT to protect crucial data from attack or other loss is the use of what is known as an air-gap. Simply stated, to air-gap a network, storage device, or system is to simply physically disconnect it from physical layer access by any outside network path (or any path whatsoever). For example, if a desktop PC is connected to the Internet via only an Ethernet cable, simply disconnecting that cable creates an air-gap between your PC and all other systems and users, making it impervious to incursion.

While an extremely simple but effective methodology, historically the use of air-gaps has been inconvenient, low-tech, and difficult or impossible to automate. Having a technician available to disconnect/reconnect cables is far from an efficient methodology. For this reason, devices utilizing Virtual Local Area Networks (VLANs) have been devised and used. A device utilizing VLAN technology, such as a network switch or router, can have the capability to isolate one hardware network connection or segment from another via software isolation. One benefit of such a system is that it can be turned on or off easily and quickly at any time in a manual or automated manner eliminating the need for onsite physical intervention. However, a disadvantage of such a system is that the device which has the VLAN capability has the separated networks on the same physical media and layer, and administratively, is physically connected to the same networks being controlled and, as such, is using in-band control signaling which can be highly vulnerable to incursion. This renders the use of VLANs for air-gap use ultimately insecure despite their convenience. Many major data breaches have been executed via subversion of VLAN security.

In view of the foregoing, a need exists for an improved system and method for generating a physical air gap in an effort to overcome the aforementioned obstacles and deficiencies of conventional systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Various embodiments disclosed herein include an Ethernet network connect/disconnect (i.e., air gap) device utilizing electromechanical relays under microprocessor control utilizing out-of-band signaling. In various examples, the data path and device control signaling path are completely physically separated, which can remove the possibility of controlling the device's signaling from the data path. As such, in various embodiments, such an air-gap device cannot be network compromised and can provide security for critical data or network segments by selective isolation.

Figure 1:
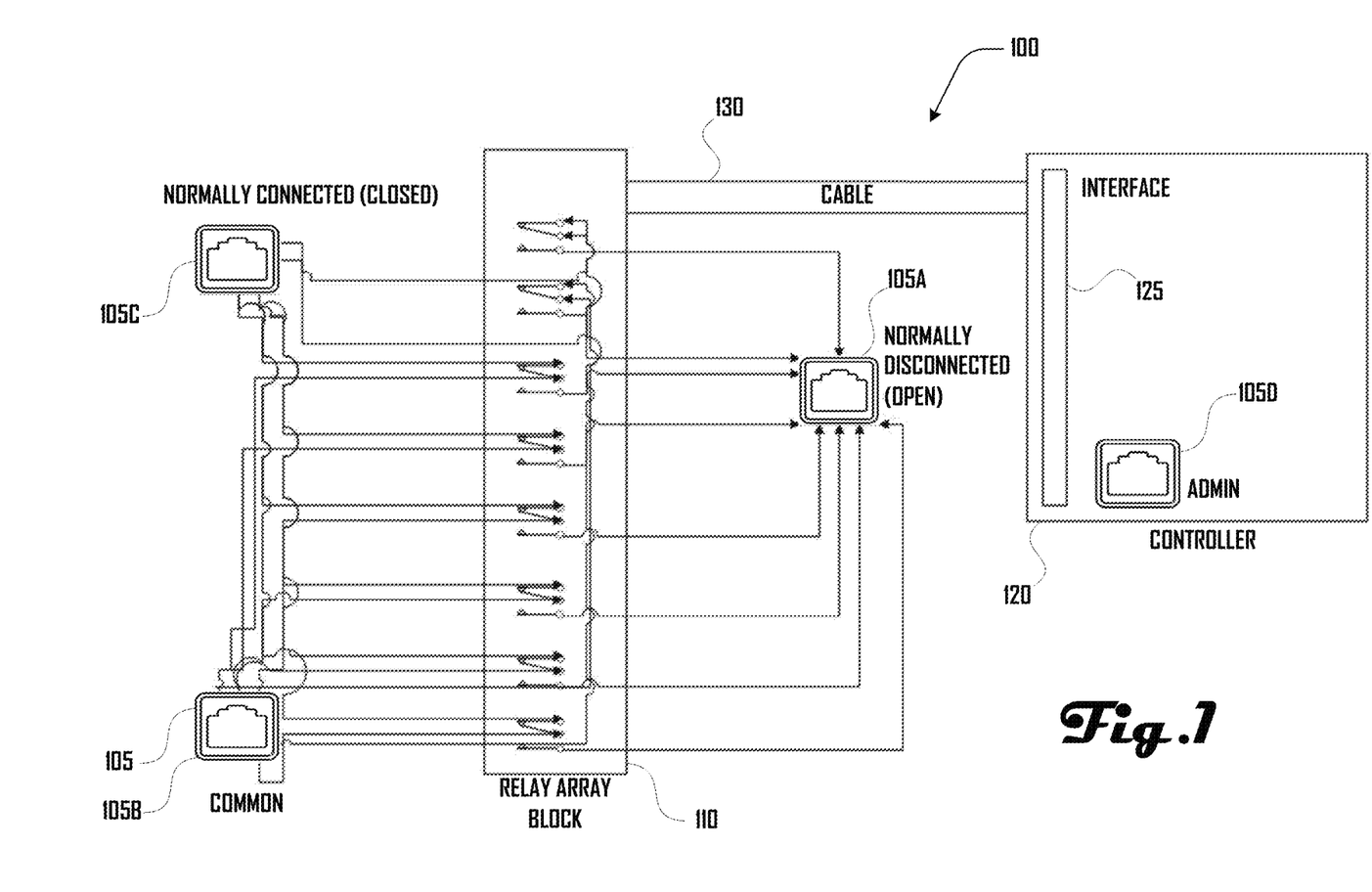
FIG. 1 is a schematic of an embodiment of an air-gap device that includes a plurality of interfaces.

Turning to FIG. 1, a schematic of an embodiment of an air-gap device 100 is illustrated, which includes a plurality of interfaces 105 including a first interface 105A that is normally disconnected or open; a second interface 105B that is a common interface; a third interface 105C that is normally connected or closed; and a fourth interface 105D that is an admin interface. The first, second and third interfaces 105A, 105B, 105C can be selectively interconnected by a relay array block 110, which is shown close-up in FIG. 2.

In various embodiments, the second interface 105B is common and can be considered the source or home interface, and at any given time, the second interface 105B is always connected to either of the first interface 105A or the third interface 105C. In various examples, it is physically impossible for the second interface 105B to ever be connected to both the first interface 105A and the third interface 105C simultaneously.

Figure 3A:
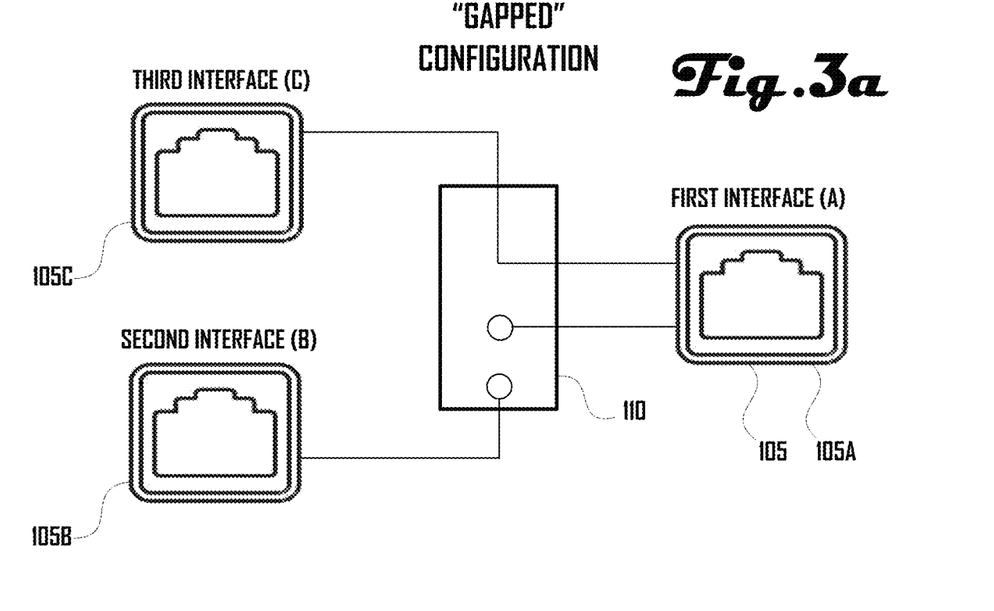
FIG. 3*a* illustrates an example of an air-gap device in a gapped configuration.
Figure 3B:
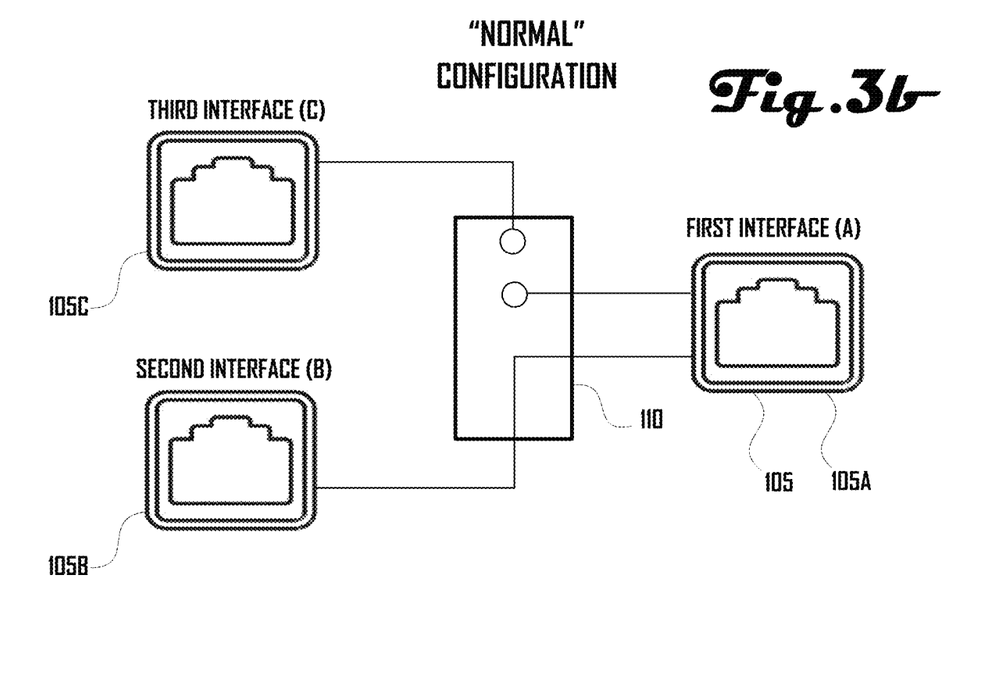
FIG. 3*b* illustrates an example of the air-gap device of FIG. 3*a* in a normal configuration.

In an embodiment, when the relay array block 110 is in a "normal" configuration (see e.g., FIG. 3*b*), the second interface 105B is connected to first interface 105A. When the relay array block 110 is in a "gapped" configuration (see e.g., FIG. 3*a*), the connection between the second interface 105B and first interface 105A is broken.

In an embodiment, when the relay array block 110 is in the "normal" configuration (see e.g., FIG. 3*b*), third interface 105C is disconnected from first interface 105A. When the relay array block 110 is in the "gapped" configuration (see e.g., FIG. 3*a*), a connection between the third interface 105C and first interface 105A is made.

In various embodiments, the relay array block 110 makes it physically impossible for the second and third interfaces 105B, 105C to be connected and makes it physically impossible for the first interface 105A to be connected to the second and third interfaces 105B, 105C at the same time.

In some embodiments, the relay array block 110 can default to the "normal" or "gapped" configuration upon power loss. For example, in one embodiment, in the event of power loss, the relay array block 110 can default to a gapped configuration where the first interface 105A is connected to the third interface 105C and the first interface 105A is disconnected from the second interface 105B (see e.g., FIG. 3a). In some embodiments, such a power-loss default can be generated from a physical mechanism of the relay array block 110 such as a spring or other biasing element that is configured to automatically move the relay array block 110 to the gapped position when power to the relay block array 110 or air-gap device 100 is lost.

While some embodiments include the first, second and third interfaces 105A, 105B, 105C where the relay array block 110 switches between C-A and C-B connections, further embodiments can include only two interfaces 105 where the relay array block 110 switches between a connected and not connected (e.g., air gapped) state between the two interfaces 105. In other words, in some embodiments, only one of interfaces 105B or 105C is necessary with interface 105A for air-gap operations with one of interfaces 105B or 105C being absent or unused if present. Such embodiments can include an 8PDT switch or an eight-pole, single-throw (8PST) switch.

As shown in FIG. 1, the fourth interface 105D can be associated with a controller 120, which is operably connected to the relay array block 110 via a cable 130. In various embodiments, the fourth interface 105D is completely physically isolated from the first, second and/or third interfaces 105A, 105B, 105C such that the fourth interface 105D cannot operably connect to any of the first, second and/or third interfaces 105A, 105B, 105C.

The controller 120 can include an interface 125 (e.g., a general-purpose input/output (GPIO) interface). The controller 120 can comprise various suitable controller devices including a Raspberry Pi microprocessor controller, or the like. In various examples, a data path generated by any of the first, second or third interfaces 105A, 105B, 105C can be completely physically separated from the control signaling path for the relay array block 110 defined by the cable 130, which in various examples, can remove the possibility of controlling the array block 110 signaling from the data path generated by any of the first, second or third interfaces 105A, 105B, 105C. Accordingly, in various embodiments, such an air-gap device 100 cannot be network compromised and can provide security for critical data or network segments by selective isolation.

Figure 4A:
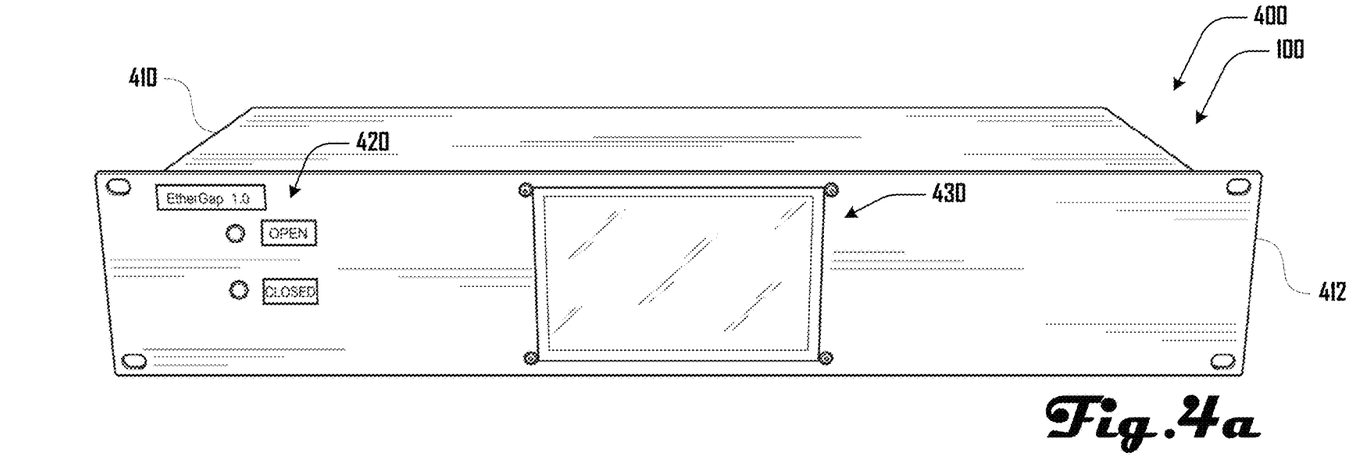
FIGS. 4*a* and 4*b* illustrate an air-gap device as a rack-mountable air-gap device with FIGS. 4*a* and 4*b* illustrating a front face and rear face respectively.
Figure 4B:
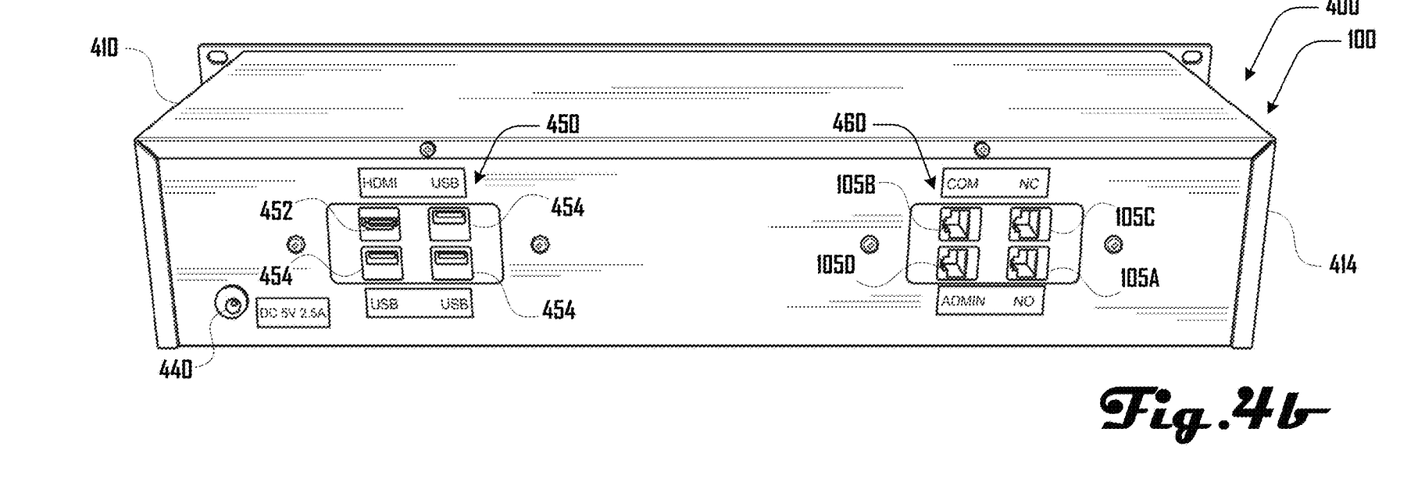

In some embodiments, the air-gap device 100 can comprise an uninterruptible power supply (UPS), which can be desirable in various examples to provide power to the air-gap device 100 in the event of external power being lost. For example, where external power is lost (e.g., via power plug 440 as shown in FIG. 4b) the UPS can be configured to power the air-gap device 100 to provide for uninterrupted operation of the air-gap device 100 for an extended period of time such as 4, 6, 8, 10, 12, 24, 48, 36 hours, and the like.

Figure 9:
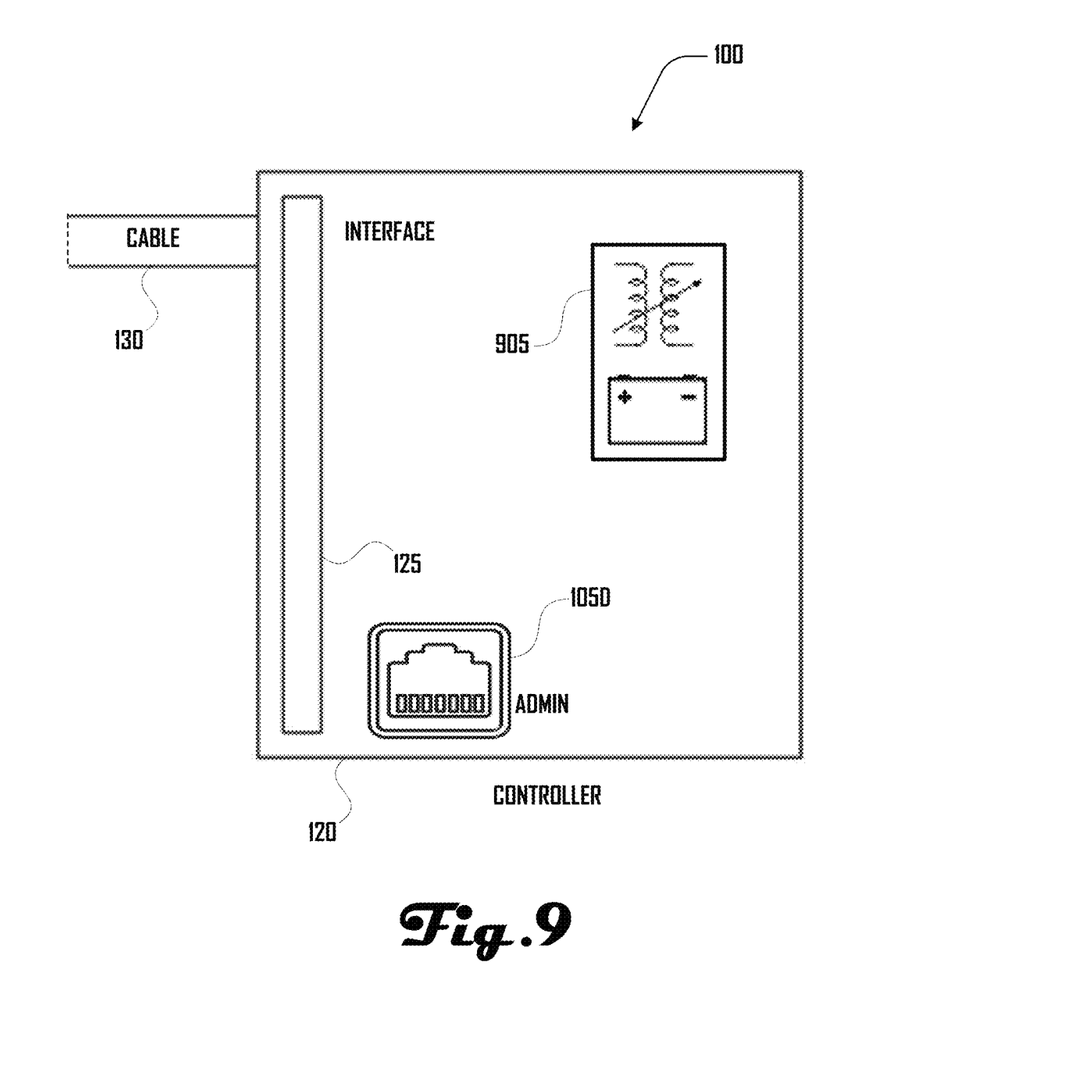
FIG. 9 illustrates one example embodiment of an air gap device where the controller includes an uninterruptible power supply (UPS) power module.

FIG. 9 illustrates one example embodiment of an air gap device 100 where the controller 102 includes a UPS power module 905. In some embodiments, a UPS power module can include four 18650 power cells combined with a buck type transformer adapter and a 4S battery management circuit which charges and maintains the batteries in addition to seamlessly switching the air-gap device 100 to battery power should AC power be interrupted and can independently power the device for 6 or more hours. In various embodiments, a UPS power module 905 can be operably associated with the controller 102 and need not be directly coupled with or be an integral part of the controller 102.

In various embodiments, the fourth interface 105D of the controller 102 can be administrative. For example, the fourth interface 105D can be used to interface with the controller 120 to configure the relay array block 110 (e.g., to switch between a normal or gapped configuration, or the like) or to program the air-gap device 100 to open or close the air-gap based on various suitable conditions, instructions, or the like.

For example, as discussed herein, in some embodiments, the configuration of the relay array block 110 can be switched based on user input at a user interface such as touchscreen, keyboard, mouse, button, separate user device, or the like. In some embodiments, the configuration of the relay array block 110 can be switched based one or more conditions being met, based on a timer or schedule, or the like.

For example, in one embodiment, the relay array block 110 can be automatically switched to a gapped configuration outside of business hours (e.g., on weekends and from 5:30 pm until 7:00 am the following day on weekdays). In another embodiment, the relay array block 110 can be automatically switched to a gapped configuration one hour after it was switched to a connected or normal connected configuration. In another embodiment, the relay array block 110 can be automatically switched to a gapped configuration based on an identified suspected intrusion of a computing device associated with the air-gap device 100; based on an identified suspected intrusion of a building or room associated with a computing system associated with the air-gap device 100; based on environmental conditions such as inclement weather, temperature, winds, or the like; based on identified tampering with the air-gap device 100; and the like.

In various embodiments, the air-gap device 100 can have logging features. For example, the air-gap device 100 can generate a log that includes one or more of: time that the air-gap device 100 configuration is changed (e.g., between normal and gapped); user profile and/or passcode associated with a change in the configuration of the air-gap device 100; type of user input used to change the configuration of the air-gap device 100; and the like. Such a logging feature can add an auditable security trail to the use of the air-gap device 100.

Figure 2:
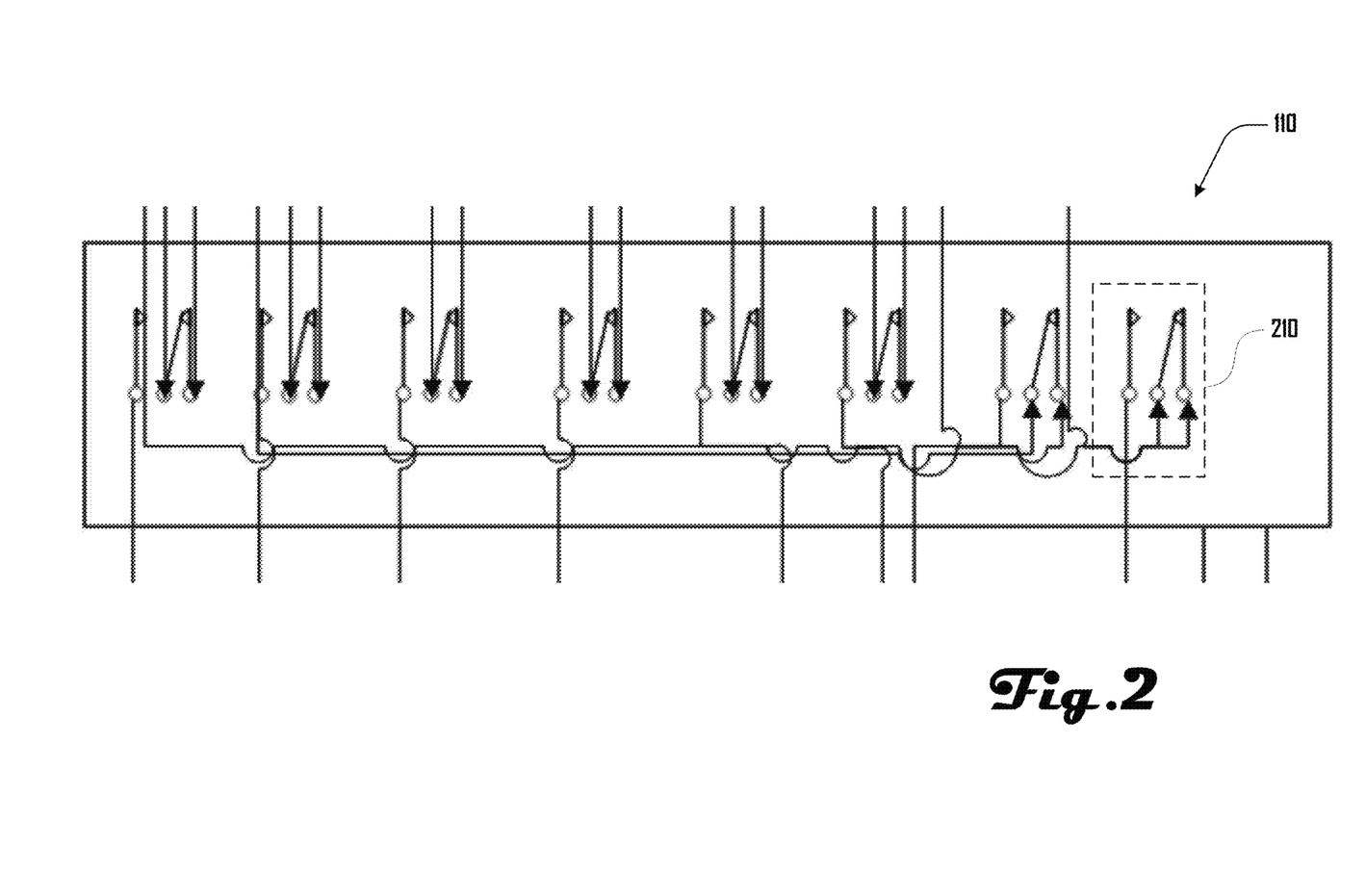
FIG. 2 is an example of a relay array block of an air-gap device in accordance with one embodiment.

As shown in the embodiment of FIGS. 1 and 2, the relay array block 110 can comprise a plurality of physical poles 210 having two throws, with each of the poles 210 corresponding to a pin or line of the first, second and third interfaces 105A, 105B, 105C. For example, FIGS. 1 and 2 show the first, second and third interfaces 105A, 105B, 105C comprising eight-pin Ethernet ports (e.g., eight-conductor, four-pair, RJ45 jack), with the relay array block 110 having eight poles 210 that respectively correspond to the eight conductors, lines, and/or pins of the first, second and third interfaces 105A, 105B, 105C. In some embodiments, the relay array block 110 can comprise eight separate relays for each of the poles 210, can comprise an eight-pole, double throw (8PDT) relay, or can comprise any other suitable configuration of relays or switches. In some embodiments, such a configuration can be desirable because Ethernet and other IEEE 802.n-based services utilize 8 conductor connections, with a 4 pair/8 conductor configuration being the de facto standard for twisted pair Ethernet of various systems regardless of whether a given circuit or system utilizes all the pairs or not.

While FIGS. 1 and 2 illustrate an example of interfaces 105 having eight conductors, lines, and/or pins and a relay array block 110 having eight corresponding poles 210, it should be clear that other suitable configurations are within the scope and spirit of the present disclosure. For example, some embodiments can include wiring and a relay array block 110 having any suitable number of conductors, lines, pins, ports, or the like, including 1, 2, 3, 4, 5, 6, 7, 8, 9, 10, 11, 12, 13, 14, 15, 16, 17, 18, 19, 20, 25, 32, 50, 64, 75, 100, 128, 150, 200, 256, 500, and the like. Accordingly, while some embodiments use Ethernet carrying TCP/IP data over twisted pair cable as a switching media, in further embodiment the media can be any other suitable media capable of communicating data (e.g., via TCP/IP or other suitable communication protocol) such as fiber optic cable, and the like. This can be achieved in some embodiments simply using different mechanical switching relays and/or connector interfaces with the same base hardware architecture of other embodiments.

Additionally, in some embodiments, there can be a plurality of relay array blocks 110, with the total number of poles 210 among the plurality of relay array blocks 110 corresponding to network wiring. For example, one embodiment can comprise two relay array blocks 110 having four poles 210 each, which can correspond to eight conductor lines of network cables. Such a plurality of relay array blocks 110 can be controlled as a unit or controlled independently in some embodiments.

Also, in some embodiments, the number of poles 210 of a relay array block 110 need not correspond to the number of conductors, lines, ports and/or pins of network cables and associated couplings. For example, the relay array block 110 can have fewer poles 210 than the number of conductors, lines, ports and/or pins of network cables and associated couplings. Additionally, while the example of FIG. 1 illustrates the first, second and third interfaces 105A, 105B, 105C having the same number of conductors, lines, ports and pins, in further embodiments, one or more of the first, second and third interfaces 105A, 105B, 105C can have a different number compared to the others.

Also, while the example of FIG. 1 illustrates the first, second and third interfaces 105A, 105B, 105C being female ports, further embodiments can include any suitable type of interface connectors (e.g., female or male) and the first, second and third interfaces 105A, 105B, 105C need not be the same type of interface or connector.

Additionally, while the example of FIG. 1 illustrates the fourth interface 105D being the same as the first, second and third interfaces 105A, 105B, 105C, in further embodiments, the fourth interface 105D can be any suitable interface as described herein and can be different than one or more of the first, second and third interfaces 105A, 105B, 105C. Also, in some embodiments, the fourth interface 105D can be absent. For example, in various embodiments, the controller 120 can communicate with an external device wirelessly and/or via hardwired interfaces, which can allow for the fourth interface 105D to be absent.

An air-gap device 100 can be embodied in various suitable ways. For example, FIGS. 4a and 4b illustrate an air-gap device 100 as a rack-mountable air-gap device 400. The rack-mountable air-gap device 400 comprises a housing 410 with a front face 412 (FIG. 4a) and a rear face 414 (FIG. 4b).

The front face 412 comprises an air-gap status indicator 420, which in this example, includes lights that indicate whether the air-gap device 100 is in an "open" configuration or a "closed" configuration. The front face further comprises a screen interface 430, which in this example comprises a touch-screen display. The screen interface 430 can be used to change the configuration of the air-gap device 100 (e.g., between open and closed). For example, the screen interface 430 can include one or more buttons that allow a user to open or close the air-gap of the air-gap device 100, and in some embodiments, a user-identifier and/or password can be required to change the configuration of the air-gap device 100.

Such user input can be provided at the screen interface, a keyboard, mouse, or external device. For example, in one embodiment, user input to change the configuration of the air-gap device 100 can be provided by a separate user device (e.g., a smart phone, tablet computer, wearable device, laptop, or the like), which can be wirelessly connected to the air-gap device 100. In various embodiments, such a user device can be wirelessly connected to the controller 120 of the air-gap device 100 via a wireless network that is not connected to the outside world (e.g., not connected to the Internet or other external network). Input from such a user device can be via a browser, mobile app, or the like. Accordingly, in various embodiments, the operation of the air gap-device 100 can be console controlled from a built-in touch screen (e.g., screen interface 430), via USB connected peripherals, via a non-public hardwired network direct connection, by a private Wi-Fi connection via integral Wi-Fi access point (WAP), and/or the like.

The rear face 414 comprises a power plug 440, which can provide a connection to a power source that powers the rack-mountable air-gap device 400. The rear face further includes a first set of ports 450, which in this embodiment includes an HDMI port 452 and three USB ports 454. In some embodiments, the HDMI port 452 can provide for an external monitor that mirrors, clones or replaces the screen interface 430 on the front face 412. The USB ports can provide for various suitable input/output functions including plugging in a keyboard, mouse, or the like, which can be used to provide user input to the rack-mountable air-gap device 400. The rear face 414 can further include a set of interfaces 460, including the first, second, third, and fourth interfaces 105A, 105B, 105C, 105D (see FIGS. 1 and 3).

The example embodiment of the rack-mountable air-gap device 400 of FIGS. 4a and 4b is only one example and should not be construed as limiting on the wide variety of other embodiments of a rack-mountable air-gap device 400, which are within the scope and spirit of the present disclosure. For example, in further embodiments, various suitable elements of the rack-mountable air-gap device 400 shown in FIGS. 4a and 4b can be absent, present in a plurality, or present in a different form or configuration.

An air gap device 100 can be used in a computer network in various suitable ways. For example, since the relay array block 110 of various embodiments can have two positions (e.g., a normally open and normally closed pole as well as a common pole), the air-gap device 100 can be used not only to interrupt a communication circuit (e.g., an Ethernet circuit) but can optionally connect the communication circuit elsewhere when the communication circuit is interrupted. For example, a backup disk array may normally be connected to a non-Internet accessible internal company network (e.g., an administrative or admin network). Then, when the air-gap device 100 is switched, the backup disk array can be connected to a production network on the Internet (and disconnected from the internal network, keeping that isolated) just long enough to perform backups or other tasks, then the air-gap of the air-gap device 100 can be opened again, which can reconnect the backup disc array to the internal network so the backups can be retrieved. In this example, the internal network is never connected to the outside world, yet data can be easily moved from one to the other. In further embodiments, a computing system having an air-gap device 100 can be configured to disconnect a normally Internet-facing network from the Internet while such a backup is being performed.

An air-gap device 100 can be used in various scenarios where data, a device, multiple devices, or entire network segments are to be isolated for security. The following are examples of deployments of an air-gap device 100, but should not be construed to be limiting on the wide variety of alternative and additional uses of an air-gap device 100 that are within the scope and spirit of the present disclosure.

Workstation Isolation Example

Any computer connected to the Internet is subject to attack and potential breach. In many business environments, workstations are connected to the Internet 24 hours a day when they are only utilized eight hours or less and possibly zero hours on weekends. This leaves the systems exposed to attack many times more than is necessary or prudent, and it is generally via this vector of connected, unattended systems that a breach is initiated. One example would be for an attacker to discover an exploitable network vulnerability or gain access via a phishing attack and then make an incursion during non-business hours when the attacker is less likely to be noticed. Since some attacks can be initiated on massive scales by automated systems, any computer connected to the Internet can be scanned by attacking systems all over the world.

Figure 5A:
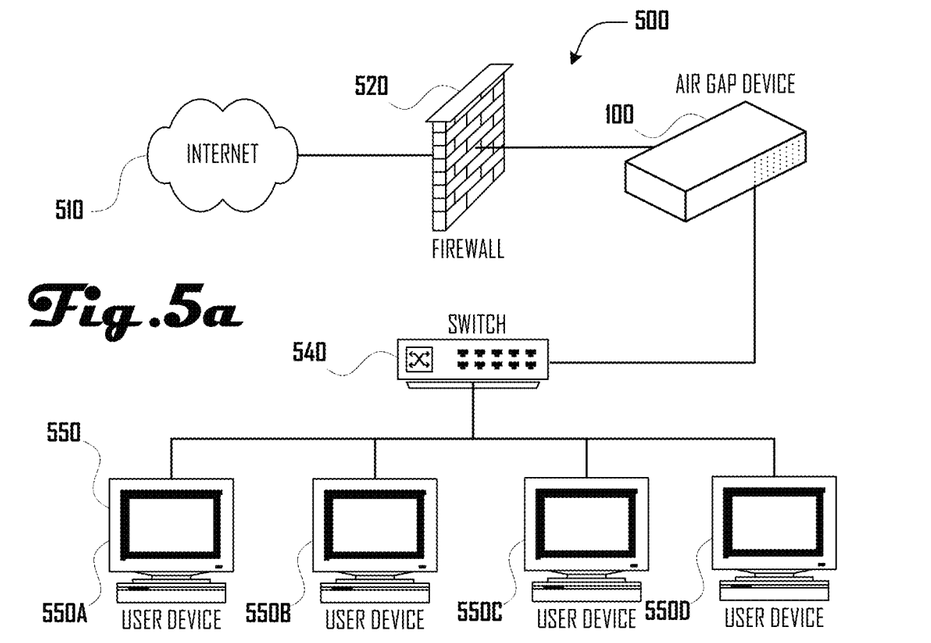
FIGS. 5*a* and 5*b* illustrate two respective configurations of an example embodiment of an air-gapped system that comprises a plurality of user devices that are connected to the Internet, via a firewall, an air-gap device and a switch.
Figure 5B:
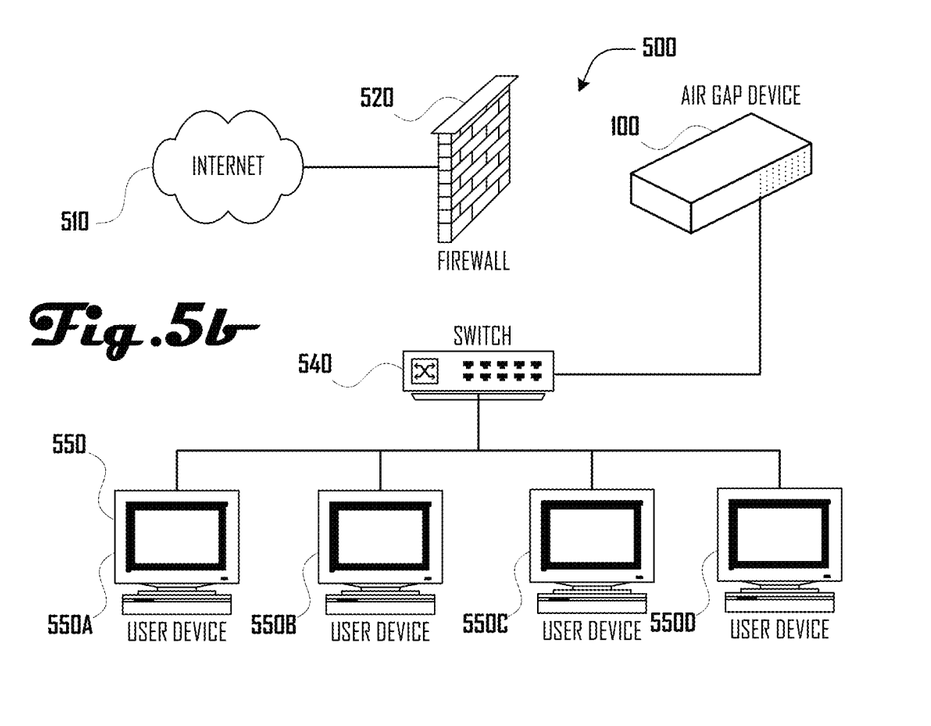

FIGS. 5a and 5b illustrate an example embodiment of an air-gapped system 500 that comprises a plurality of user devices 550 that are connected to the Internet 510, via a firewall 520, an air-gap device 100 and a switch 540. Specifically, as shown in FIGS. 5a and 5b, the user devices 550A, 550B, 550C, 550D are operably connected to the switch 540, which is operably connected to the air-gap device 100. The air-gap device 100 can be connected to the internet 510 via the firewall 520 as shown in FIG. 5a, but can be disconnected from the internet 510 as shown in FIG. 5b.

For example, in this embodiment of an air-gapped system 500, an entire workstation segment of a LAN (i.e., the user devices 550, switch 540, and the like) can be disconnected from the Internet 510 outside of business hours so as to eliminate this exposure entirely. Systems can still be connected on the interior LAN and, as such, can propagate OS updates and similar. In some examples, a timer-based schedule can be programmed in this scenario, but the isolation of the interior LAN can be overridden, for example, by an ad hoc connection for special circumstances such as an employee or admin working off hours, or the like, which could require or justify exposure to the Internet.

Example Financial Asset Custody—Cryptocurrencies

Custody of financial assets is another example application of an air-gap device 100 with cryptocurrencies being one example of such a financial asset. A significant portion of financial assets today are held in electronic form, and isolation of such financial assets from WAN access can be desirable at all times except when such assets are being transferred. This can be known as "cold storage."

Cryptocurrencies in particular can be exceptionally high value targets for breach because their format and methodology for use can be open-source routed on public networks as opposed to bank assets which are often in proprietary formats and moved on closed, proprietary networks, such as SWIFT, and the like.

Cryptocurrencies can utilize key-based wallets, and leaving such wallets online, such as in an exchange, can invite attack and breach, resulting in loss. While cryptocurrencies such as Bitcoin offer security via encryption, storing Bitcoin wallets online can undermine this security unnecessarily, such as in the case of the Mt. Gox exchange breach. As such, it can be desirable for entities (e.g., banks, exchanges, etc.) to utilize cold-storage of wallets. This can involve storing the wallets in air-gapped storage which can be impervious to attack. Since access to wallets should optimally be fast and convenient to allow for rapid trades and transactions, use of an air-gap device 100 can present a desirable solution that provides for security through isolation while also providing for rapid trades and transactions.

Figure 6A:
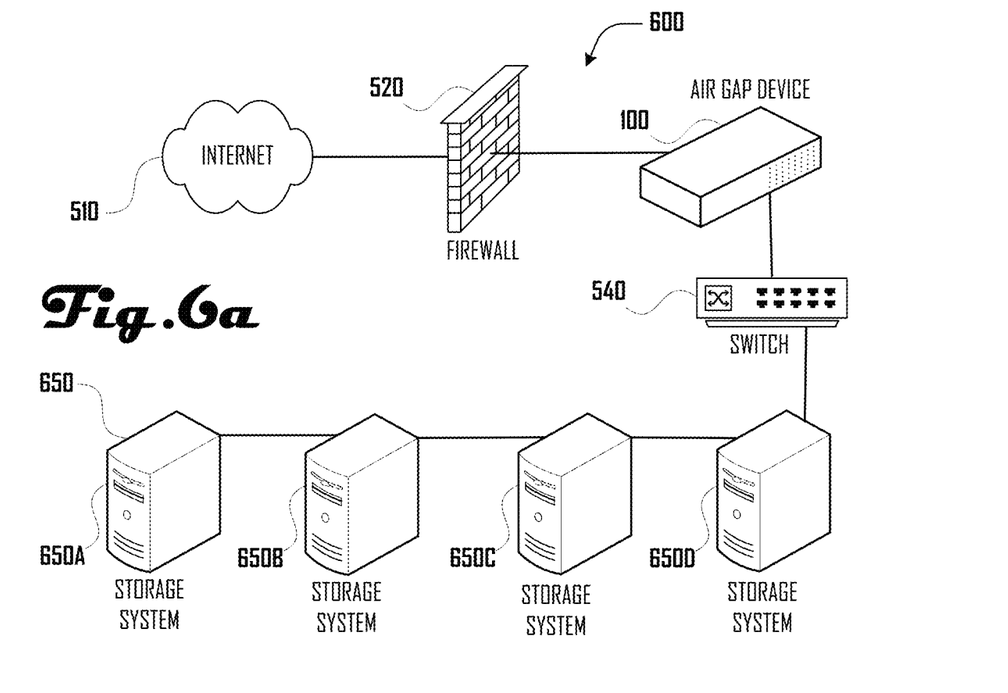
FIGS. 6*a* and 6*b* illustrate two respective configurations of another example embodiment of an air-gapped system that comprises a plurality of storage systems that are connected to the Internet, via a firewall, an air-gap device and a switch.
Figure 6B:
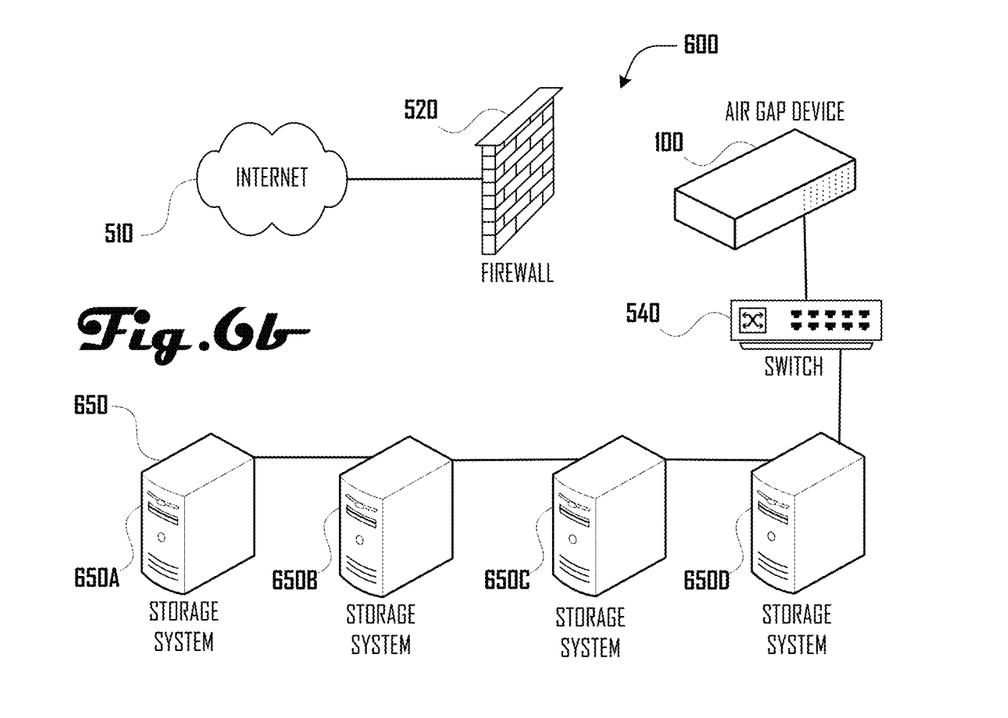

FIGS. 6a and 6b illustrate another example embodiment of an air-gapped system 600 that comprises a plurality of storage systems 650 that are connected to the Internet 510, via a firewall 520, an air-gap device 100 and a switch 540. Specifically, as shown in FIGS. 6a and 6b, the storage systems 650A, 650B, 650C, 650D are operably connected to the switch 540, which is operably connected to the air-gap device 100. The air-gap device 100 can be connected to the internet 510 via the firewall 520 as shown in FIG. 5a, but can be disconnected from the internet 510 as shown in FIG. 5b. For example, the air-gap device 100 can isolate the storage systems 650, which can be storing cryptocurrency wallets and the like, at all times aside from when cryptocurrency trades or transactions are occurring.

Data Backup Isolation Example

Data backups can be an important defense against ransom attacks. If proper data backups are performed on a regular basis and an entity's systems are breached, the backups can minimize or eliminate the damage that could be caused by the incursion.

In some examples, attackers can breach a network, breach some or all systems on that network, and then encrypt the data on those systems and demand a ransom for its decryption. Because encryption schemes used are extremely difficult or impossible to decrypt without the encryption keys, the victim usually only has the choice of paying the ransom. Entire businesses, and in fact entire cities, have fallen prey to this scenario, and most have been forced to pay the (usually escalating) ransom. If backup systems are in operation and regularly copying data of the system, then that backup data can be used to restore the encrypted ransom data after the network has been secured. However, if the backup systems are connected to the same network as the primary systems, in most cases backup system are encrypted and ransomed as well, making them useless. When backups are isolated and protected, compromised data can be revised and the backups can be used to restore from "bare metal."

Figure 7:
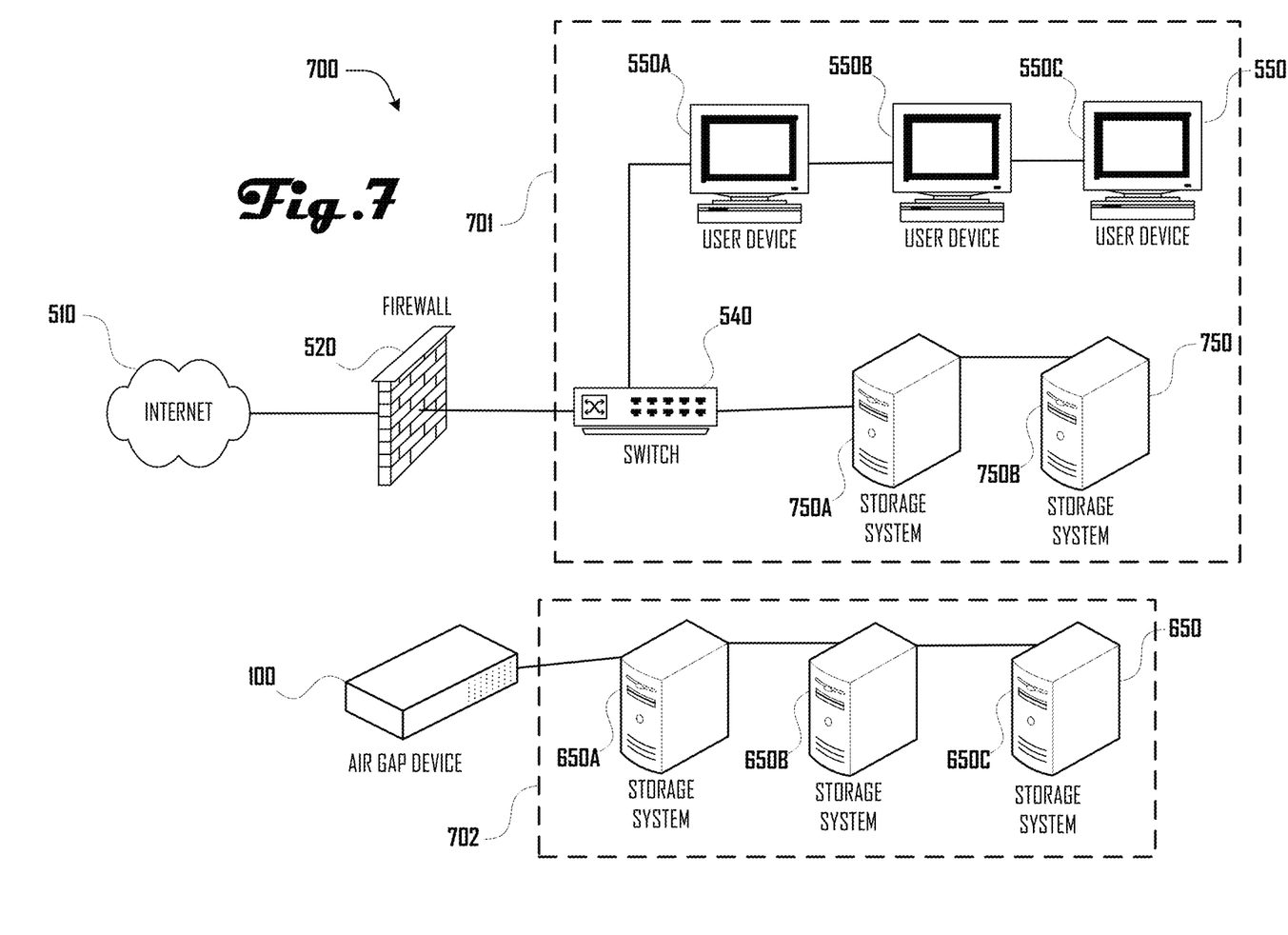
FIGS. 7 and 8 illustrate two respective configurations of an example air-gapped network having a primary network portion and an isolated network portion.
Figure 8:
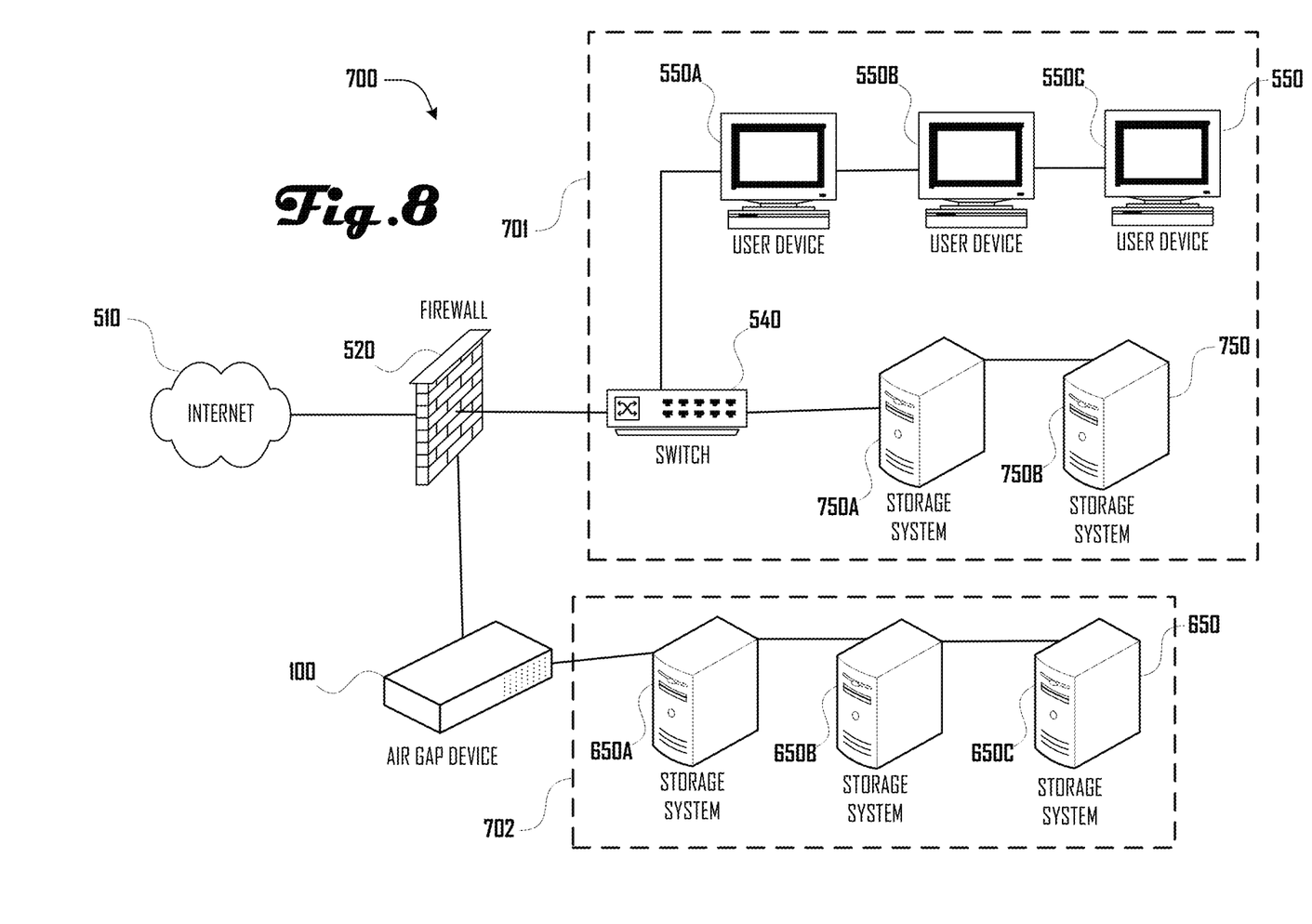

For example, FIGS. 7 and 8 illustrate an example air-gapped network 700 having a primary network portion 701 and an isolated network portion 702. In this example, the primary network comprises a plurality of user devices 550 and storage systems 750 that are operably connected to a switch 540. The primary network 701 is connected to the internet 510, via a firewall 520 that is operably connected to the switch 540 of the primary network.

The isolated network portion 702 can comprise a plurality of storage systems 650 that are operably connected to an air-gap device 100, which can create an air-gap between the internet 510 and primary network 701 as shown in FIG. 7 and selectively provide a connection to the internet 510 and primary network 701 via a connection to the firewall 520.

In various embodiments air-gap device 100 can be configured such that the air-gap device 100 is invisible from the primary network 701 at nearly all times, and the air-gap device 100 can operate with total defilade from attack by an intruder on the primary network 701, and the air-gap device 100 and associated isolated network portion 702 would likely never be known by an attacker to exist because the air-gap device 100 and associated isolated network portion 702 would not be discoverable. In some embodiments, some or the entirety of backup operations can be programmed from a portion of the isolated network portion 702 and/or by the air-gap device 100.

For example, a backup method can include connecting the secure isolated network portion 702 to the primary network 702 by removing an air-gap generated by the air-gap device 100 (see e.g., FIG. 8); backing up devices on the primary network (e.g., user devices 550 and storage systems 750); and immediately disconnecting the secure isolated network portion 702 from the primary network 701 via the air-gap device 100 once the backup is complete. By "pulling" the data from primary network side 701 to the secure isolated network portion 702 in this manner, an intruder would never know of the existence of the secure isolated network portion 702. Even if such an intruder knew about or could somehow determine that the air-gap device 100 and/or secure isolated network portion 702 exists, because the controller 120 of the air-gap device 100 (see FIG. 1) is never connected to the primary network 701 in various embodiments, an intruder simply could never communicate with controller 120 to reconfigure or actuate the air-gap device 100 to remove the air-gap between the primary network portion 701 and air-gap device 100. As such, backups can be performed and stored in as near perfect a manner from a security standpoint as possible. In a configuration where only storage is connected to the secure network, the possibility of an incursion can be extremely remote since there are no programmable devices to be attacked.

In some embodiments, for additional security, the air-gap device 100 can be configured to first disconnect the primary network 701 from the Internet 510; then perform backups to the secure isolated network portion 702 as discussed herein, and then only reconnect the primary network 701 to the Internet 510 once the backup method to the secure isolated network portion 702 is completed. In various embodiments, in such a method, a path from the Internet WAN to the backup network LAN never exists, adding a secondary layer of security.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments where that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. A method of communicating and securing data on a network with an air-gap device:
    maintaining, by the air-gap device, a first operable connection between a first network portion of the network that is isolated from the Internet and a communication circuit to a plurality of devices that are isolated from the Internet while also maintaining a first air-gap that isolates the communication circuit to the plurality of devices from a second network portion of the network that is connected to the Internet;
    performing, by the air-gap device, a temporary first switching of the first air-gap such that a second air-gap is generated between the first network portion that is isolated from the Internet and the communication circuit to the plurality of devices, and such that a second operable connection is generated between the communication circuit to the plurality of devices and the second network portion that is connected to the Internet, the first switching performed temporarily to facilitate a first data transfer;
    performing the first data transfer by communicating, via the second operable connection, a set of data from the second network portion that is connected to the Internet, to the plurality of devices;
    in response to the first data transfer being complete, performing a second switching of the second air-gap such that the first air-gap is generated again that isolates the communication circuit to the plurality of devices from the second network portion that is connected to the Internet and such that the first operable connection is generated again between the first network portion that is isolated from the Internet and the communication circuit to the plurality of devices,
    wherein the air-gap device is a rack-mounted component that comprises:
        a first interface comprising a first eight-pin Ethernet port, the first interface connected to the communication circuit to the plurality of devices;
        a second interface comprising a second eight-pin Ethernet port, the second interface connected to the first network portion that is isolated from the Internet;
        a third interface comprising a third eight-pin Ethernet port, the third interface connected to the second network portion that is connected to the Internet;
        a fourth interface comprising a fourth eight-pin Ethernet port, the fourth interface completely physically isolated from the first, second and third interfaces such that the fourth interface cannot operably connect to any of the first, second or third interfaces;
        a physical relay array block having eight poles that respectively correspond to eight conductors, lines, and/or pins of the first, second and third interfaces, with the physical relay array block:
            configured for physical switching between a first and second configuration that generates the first and second switching via:
                connection of the first interface to the second interface or connection of the first interface to the third interface; and
                generating an air-gap between the first interface and the second interface or generating an air-gap between the first interface and the third interface; and making it physically impossible for the second and third interfaces to be operably connected and makes it physically impossible for the first interface to be connected to the second and third interfaces at the same time;
a controller that is operably connected to the physical relay array block via a control data path and configured to control the physical switching between the first and second configuration that generates the first and second switching, where the control data path is completely physically separated from data paths generated by the first, second and third interfaces such that the data paths generated by the first, second and third interfaces are incapable of controlling the array block, wherein the controller is operably coupled to and configured to receive control instructions via the fourth interface;
a rack-mountable housing having:
a front face that includes an air-gap status indicator, an air-gap interface configured to trigger the physical switching of the relay array block between the first and second configurations; and
a rear face that includes the first, second, third and fourth eight-pin Ethernet ports, and a power plug that provides a connection to a power source that powers the rack-mounted air-gap device.

2. The method of claim 1, wherein the plurality of devices that are isolated from the Internet comprise a plurality of storage systems, wherein the first switching is performed temporarily to facilitate a backup of the network by storing network backup data on the plurality of storage systems, the network backup data including the set of data communicated from the second network portion that is connected to the Internet.

3. The method of claim 1, wherein the physical relay array block is biased to physically default to the first configuration upon power loss, such that when the air-gap device loses power, the relay array block automatically switches to the first configuration when in the relay array block is in the second configuration.

4. A method of communicating and securing data on a network with an air-gap device:
maintaining, by the air-gap device, a first operable connection between a first network portion of the network and a communication circuit to one or more isolated devices while also maintaining a first air-gap that isolates the communication circuit to the one or more isolated devices from a second network portion of the network;
performing, by the air-gap device, a first switching of the first air-gap such that a second air-gap is generated between the first network portion and the communication circuit to the one or more isolated devices, and such that a second operable connection is generated between the communication circuit to the one or more isolated devices and the second network portion;
performing a first data transfer by communicating, via the second operable connection, a set of data from the second network portion to the one or more isolated devices;
performing a second switching of the second air-gap such that the first air-gap is generated again that isolates the communication circuit to the one or more isolated devices from the second network portion and such that the first operable connection is generated again between the first network portion and the communication circuit to the one or more isolated devices, wherein the air-gap device comprises:
a first interface comprising a first port, the first interface connected to the communication circuit to the one or more isolated devices;
a second interface comprising a second port, the second interface connected to the first network portion;
a third interface comprising a third port, the third interface connected to the second network portion;
a physical relay array block having poles that respectively correspond to conductors, lines, and/or pins of the first, second and third interfaces, with the physical relay array block:
configured for physical switching between a first and second configuration that generates the first and second switching via:
connection of the first interface to the second interface or connection of the first interface to the third interface; and
generating an air-gap between the first interface and the second interface or generating an air-gap between the first interface and the third interface; and
makes it physically impossible for the second and third interfaces to be connected and makes it physically impossible for the first interface to be connected to the second and third interfaces at the same time; and
a controller that is operably connected to the physical relay array block via a control data path and configured to control the physical switching between the first and second configuration that generates the first and second switching, where the control data path is completely physically separated from data paths generated by the first, second and third interfaces such that the data paths generated by the first, second and third interfaces are incapable of controlling the array block.

5. The method of claim 4, wherein:
the first network portion of the network is isolated from the Internet;
the second network portion of the network is connected to the Internet; and
the one or more isolated devices are isolated from the Internet except for when operably connected to the second network portion via the air-gap device.

6. The method of claim 4, wherein the first switching performed temporarily to facilitate a first data backup transfer and wherein the second switching is performed in response to the first data backup transfer being complete.

7. The method of claim 4, wherein the first, second and third ports are Ethernet ports.

8. The method of claim 4, wherein the air-gap device further comprises a fourth interface having a fourth port, the fourth interface completely physically isolated from the first, second and third interfaces such that the fourth interface cannot operably connect to any of the first, second or third interfaces; and
wherein the controller is operably coupled to and configured receive control instructions via the fourth interface.

9. The method of claim 4, wherein the air-gap device further comprises a rack-mountable housing having:
a front face that includes an air-gap status indicator, an air-gap interface configured to trigger the physical switching of the relay array block between the first and second configurations; and a rear face that includes the first, second, and third ports, and a power plug that provides a connection to a power source that powers the air-gap device.

10. A method of communicating and securing data on a network with an air-gap device:
   maintaining, by the air-gap device, a first operable connection between a second port and a first communication circuit to one or more devices while also maintaining a first air-gap that isolates the communication circuit to the one or more devices from a third port;
   performing, by the air-gap device, a first switching of the first air-gap such that a second air-gap is generated between the second port and the first communication circuit to the one or more devices, and such that a second operable connection is generated between the first communication circuit to the one or more devices and the third port;
   performing a first data transfer by communicating, via the second operable connection, a set of data to the one or more devices;
   performing a second switching of the second air-gap such that the first air-gap is generated again that isolates the first communication circuit to the one or more devices from the third port and such that the first operable connection is generated again between the second port and the communication circuit to the one or more devices,
   wherein the air-gap device comprises:
      a first interface comprising a first port, the first interface being part of the first communication circuit to the one or more devices;
      a second interface comprising the second port;
      a third interface comprising the third port; and
      a physical relay array block operably coupled to and corresponding to the first, second and third interfaces, with the physical relay array block configured for physical switching between a first and second configuration that generates the first and second switching.

11. The method of claim 10, wherein:
the second interface is connected to a first network portion and
the third interface is connected to a second network portion.

12. The method of claim 11, wherein:
the first network portion of the network is isolated from the Internet;
the second network portion of the network is connected to the Internet; and
the one or more devices are isolated from the Internet except for when operably connected to the second network portion via the air-gap device.

13. The method of claim 10, wherein the relay array block comprises poles that respectively correspond to conductors, lines, and/or pins of the first, second and third interfaces.

14. The method of claim 10, wherein the relay array block is configured for physical switching between the first and second configuration that generates the first and second switching via connection of the first interface to the second interface or connection of the first interface to the third interface.

15. The method of claim 10, wherein the relay array block is configured for physical switching between the first and second configuration that generates the first and second switching via generating an air-gap between the first interface and the second interface or generating an air-gap between the first interface and the third interface.

16. The method of claim 10, wherein the relay array block is configured such that it is physically impossible for the second and third interfaces to be connected.

17. The method of claim 10, wherein the relay array block is configured such that it is physically impossible for the first interface to be connected to the second and third interfaces at the same time.

18. The method of claim 10, wherein the air-gap device comprises a controller that is operably connected to the physical relay array block via a control data path and configured to control the physical switching between the first and second configuration that generates the first and second switching, where the control data path is completely physically separated from data paths generated by the first, second and third interfaces such that the data paths generated by the first, second and third interfaces are incapable of controlling the array block.

19. The method of claim 10, wherein the first, second and third ports are Ethernet ports.

20. The method of claim 10, wherein the air-gap device further comprises a rack-mountable housing having:
   a front face that includes an air-gap status indicator, an air-gap interface configured to trigger the physical switching of the relay array block between the first and second configurations; and
   a rear face that includes the first, second, and third ports, and a power plug that provides a connection to a power source that powers the rack-mounted air-gap device.

* * * * *